United States Patent [19]
Berger

[11] Patent Number: 6,067,399
[45] Date of Patent: May 23, 2000

[54] PRIVACY MODE FOR ACQUISITION CAMERAS AND CAMCORDERS

[75] Inventor: Andres M. Berger, Oakland, N.J.

[73] Assignees: Sony Corporation, Tokyo, Japan; Sony Electronics, Inc., Park Ridge, N.J.

[21] Appl. No.: 09/145,534

[22] Filed: Sep. 2, 1998

[51] Int. Cl.[7] .............................. H04N 5/76; H04N 5/91

[52] U.S. Cl. ................................. 386/46; 386/1

[58] Field of Search ................... 386/46, 83, 52, 386/94, 95, 96, 100, 104, 107, 117, 124, 1, 31; 360/32; 381/61, 62; H04N 5/76, 5/91

[56] References Cited
U.S. PATENT DOCUMENTS 5,327,521  7/1994  Savie et al. .............................. 381/61
5,541,649  7/1996  Yamamoto .............................. 348/223

Primary Examiner—Robert Chevalier
Attorney, Agent, or Firm—Frommer Lawrence & Haug, LLP; William S. Frommer

[57] ABSTRACT

A method and apparatus for recording video data by receiving unrecorded video data from a subject and detecting the skin tone detail of the subject, or if the subject is an inanimate object, any characteristic color thereof. The video information corresponding to the detected skin tone detail is manipulated, and then the video data, including the manipulated video data, is recorded so as to obscure the video image corresponding to the detected skin tone detail.

36 Claims, 3 Drawing Sheets

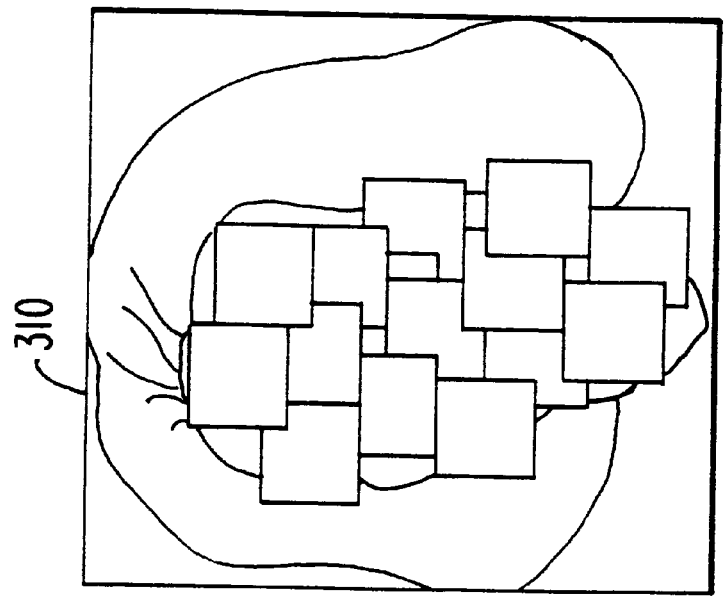
FIG. 3
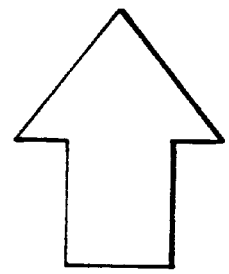
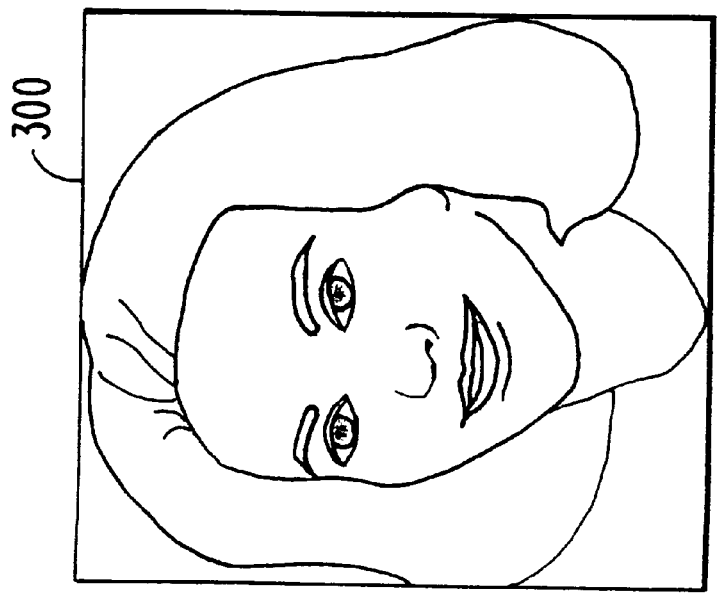

PRIVACY MODE FOR ACQUISITION CAMERAS AND CAMCORDERS

BACKGROUND OF THE INVENTION

This invention relates generally to a video recorder camera for recording video information, and more particularly to a video recorder camera for recording a testimonial or the like by an individual person or speaker, and insuring the privacy of the identity of this person.

Often when giving a video taped interview, a speaker does not wish to be identified on the videotape or when the videotape is replayed or reproduced. This may be for reasons of security, or otherwise. For whatever the reason, the identity of the speaker must be maintained in confidence. Indeed, without the guarantee of this secrecy, many speakers would not give testimony. Thus, it is quite important to be able to provide guaranteed security.

In the prior art, in order to provide security of the identity of a speaker, the interview of the speaker is taped in private, and upon playback, the portion of the video information including the user's face is modified in some way to hide the identity of the speaker. This method of hiding the identity does not allow the identity of the speaker to be known to anyone viewing the playback program, which includes only the modified video information instead of features of the speaker which might allow a viewer to determine his or her identity. However, the first source tape still exists without any modification of the video information, and thus with the speaker's identity thereon without any secrecy. This poses a problem for security of the identity of the speaker.

In an alternative prior art embodiment, a speaker is photographed by the video camera with a bright light behind his or her head thereby casting a shadow over the speaker's face so that features the face cannot be viewed and thus the identity of the speaker cannot be identified. However, it is very difficult to provide such a setup on location, outside of a studio, where many interviews occur. For example, if the interview takes place on a sunlit day, it would be very difficult to overshadow the sunlight with a portable bright light behind the speaker's head.

Therefore, it would be beneficial to provide a video recorder camera which insures the privacy of a speaker upon recording of the testimony of the speaker.

OBJECTS OF THE INVENTION

Accordingly, it is an object of the invention to provide an improved video recorder camera capable of maintaining the secrecy of the identity of a subject.

Another object of the invention is to provide an improved video recorder camera in which the video information comprising a subject's identity is obscured upon recording.

A still further object of the invention is to provide an improved video camera recorder that allows for the modification of video data corresponding to a subject, or speaker's face, upon recording.

A still further object of the invention is to provide an improved recorder that allows for the modification of audio data upon recording.

Still another object of the invention is to provide an improved video camera recorder which provides a graphical overlay over a user's face upon recording so as to obscure the identity thereof from even the original source videotape.

Still other objects and advantages of the invention will be apparent from the specification and drawings.

SUMMARY OF THE INVENTION

In accordance with the invention, an improved video camera recorder is provided for recording various video information, and especially for recording an interview or the like with a subject, referred to as a speaker, whose identity is to be maintained in secrecy. When the interview is recorded, the photographer indicates, either manually or automatically, which portion of the video information comprises the user's skin tone, and this skin tone color is then recognized by the camera. Upon the selection of the privacy mode, the video information corresponding to the skin tone color, comprising skin tone data, is manipulated prior to recording so that the recorded image comprising the speaker's face is obscured. Therefore the identity of the speaker is never recorded even on the first original recording. The invention further comprises the ability to manipulate the audio information from the speaker so as to similarly disguise the speaker's voice.

Thus, in accordance with the invention, the original video recording of an interview will not include an identifiable picture of the speaker's face, but rather will include only manipulated data obscuring the facial view, thereby preserving the secrecy of the identity of the speaker.

The invention accordingly comprises several steps and the relation of one or more of such steps with respect to each of the others, and the apparatus embodying features of construction, combinations of elements and arrangement of parts which are adopted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 3 is a depiction of a recorded video image in accordance with the invention.

DETAILED DESCRIPTION OF THE PREFERRED EMBODIMENTS

Figure 1:
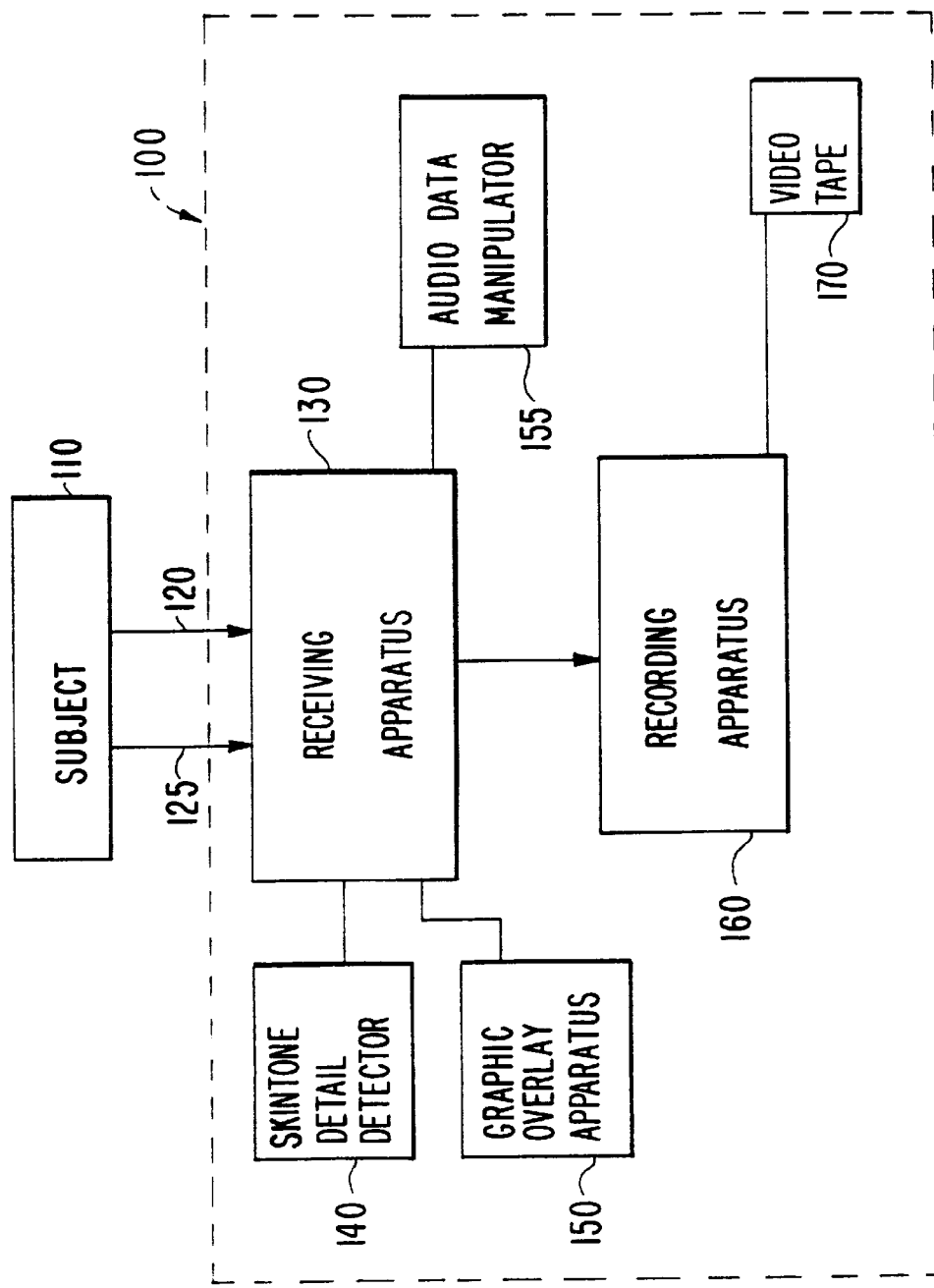
FIG. 1 is a block diagram depicting a video recording apparatus constructed in accordance with the invention.

Reference is first made to FIG. 1 which depicts a video recording apparatus 100 constructed in accordance with the invention. Video recording apparatus 100 includes a signal receiving apparatus 130, a skin tone detail detector 140, a graphic overlay apparatus 150, an audio data manipulator 155, and a recording apparatus 160. Video recorder 100 also includes a receiving area for receiving videotape 170, or any other recording medium, as appropriate. In video recorder 100, skin tone detail detector 140 is of the type known in the art such as is currently available on many advanced television cameras. This skin tone detail detector allows a user to indicate to the camera which portion of the video data includes skin tone detail. The camera memorizes this color, and then determines whether skin tone is present in any other frames. The camera can then also "improve" any inconsistencies in the color from the data received. In an alternative embodiment, skin tone detail detector 140 automatically detects skin tone detail based on its color. Furthermore, in an additional alternative embodiment, the detected color may be any color characteristic of any object, thus allowing for any object to be selected to be acted upon in accordance with the invention.

If more than one skin tone color is detected, the skin tone detail detector 140 prompts a user to select the proper skin tone detail, and then proceeds using this as the skin tone detail color. Alternatively, a camera may be provided with more than one skin tone detail detection circuit. Thus, a user would indicate a first color to be considered a first skin tone color, and a second color to be considered a second skin tone color. This feature could be used to designate the faces of two different speakers as a skin tone, or could alternatively be used to designate features having different colors of the same speaker. Thus, even though not a true skin tone, it would be possible to designate hair, facial hair or features having any other color as one of the "skin detail" colors. The apparatus would then treat this color as one to be acted upon in accordance with the invention. This same procedure could also be applied to the designation of the color of any object to be acted upon by the apparatus.

Figure 2:
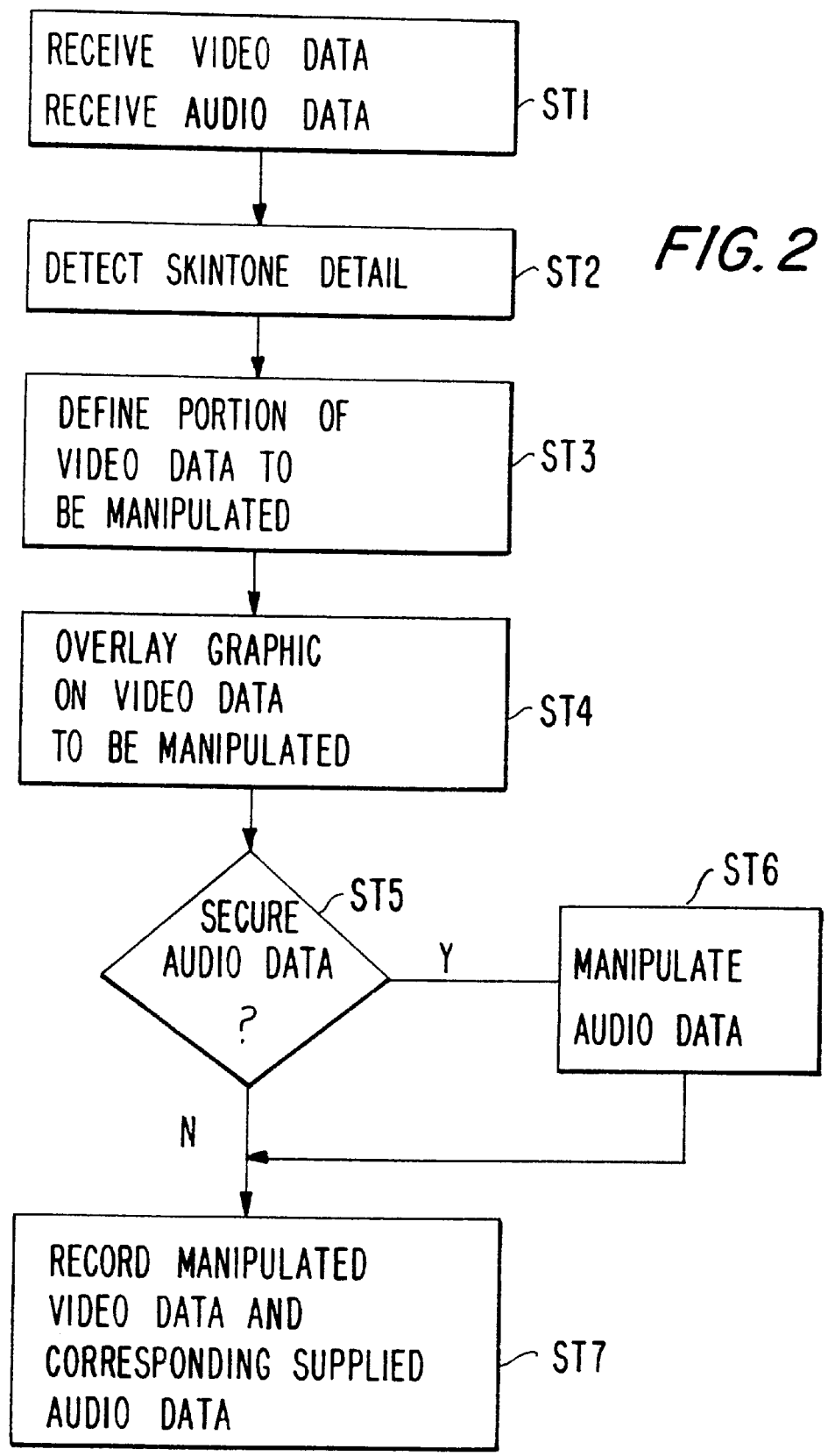
FIG. 2 is a flow diagram depicting the method of recording in accordance with the invention.

Referring now to FIG. 2 in addition to FIG. 1, the operation of video recorder 100 constructed in accordance with the invention will now be described. At step ST1, video recorder 100 receives, at receiving apparatus 130, video data 120 and audio data 125 representative of a subject 110. At step ST2, skin tone detail detector 140 detects the skin tone as noted above, by either an indication by a user, or automatically. (Multiple skin tones or color tones other than skin tone may also be designated, as noted above). After detection of the skin tone detail, the routine advances to step ST3 wherein graphic overlay apparatus 150 defines the portion of the video data 120 to be manipulated and thus obscured. It is presumed that this portion to be manipulated is coextensive with the skin tone detail detected by skin tone detail detector 140. However, in an alternative embodiment, a user is able to modify a portion of the video data 120 to be manipulated by use of a particular pointer for indicating the portion of the video image in graphic overlay apparatus 150. This feature may be useful when a speaker has facial hair or the like, or is situated in a shadow so that the skin tone detail color picked-up by skin tone detail detector 140 and transferred to graphic overlay apparatus 150 does not extend across the speaker's entire face. Thus, the manual designation of additional portions of video data 120 to be manipulated by graphic overlay apparatus 150 is possible, thereby providing further increased secrecy and security to a speaker.

After the portion of the video data 120 to be manipulated and obscured has been defined, graphic overlay apparatus 150 overlays a graphic on the video data 120 to be manipulated. Such a graphic may include a dark patch, a mosaic, an extremely out-of-focus picture, or any other way of obscuring video data, thereby maintaining secrecy of the identity of subject 110. The application of this graphic is performed in a manner as is known in the art.

Specifically, after graphic overlay apparatus has been informed of the extent of the portion of video data 120 which is to be obscured, (consisting of the skin tone detail indicated by skin tone detail detector 140, skin tone detail indicated by any additional skin tone detail detectors, as noted above, and any other portion of video data 120 indicated manually by a user by use of a particular pointer as noted above to be modified) graphic overlay device 150 either replaces the indicated portion of video data 120, or in an alternative embodiment, manipulates the indicated portion of video data 120. If the indicated portion of video data 120 is to be replaced, as noted above, a dark patch, a mosaic or the like is substituted therefor. Thus, the original received video data 120 corresponding to the portion of the video image which it is desired not to record is substituted for by an alternative video image, which is then recorded. If the indicated portion of video data 120 is to be manipulated as in the alternative embodiment, a conversion algorithm is defined and is applied to the indicated portion of video data 120. In this manner, the indicated video data is transformed from the original video image to a different video image, as based upon the transformation algorithm. This different video image is presumably a scrambled version of the original video data which is sufficient to maintain the secrecy of the identity of the speaker.

After overlaying the graphic on the video data 120 to be manipulated, or otherwise altering the video data so as to obscure the identity of the speaker in step ST4, the routine proceeds to step ST5, where it is determined whether a user wishes to secure accompanying audio data 125. If this inquiry is answered in the affirmative, audio data manipulator 155 manipulates audio data 125 in step ST6, by changing the tone, or other characteristics of audio data 125 so as to further obscure the identity of subject 110. Similarly to the manipulation of video data 120, audio data 125 may be digitized, and thereafter, a conversion algorithm may be applied thereto to modify audio data 125. However, while the object is to obscure the video data 120 corresponding to the speaker's face, the audio data should be transformed and obscured in a manner whereby the identity of the speaker is maintained in secrecy, but the audio data 125 is still intelligible. Thus, the conversion algorithm for audio data 125 should be formulated or chosen with care.

After this manipulation of audio data 125, or if inquiry ST5 is answered in the negative, video data 120 and audio data 125 (either manipulated or not manipulated) is recorded in step ST7 by recording apparatus 160 on videotape 170. In an alternative embodiment where video data is not being recorded, of if video data 120 does not need to be manipulated, such as if the speaker is facing with his or her back to the camera, it is still possible to apply only the audio manipulation technique to obscure audio data 125 and protect the secrecy of the identity of the speaker.

It should be noted that while the recording has been performed on video tape 170, it is possible to record video and audio data 120 and 125 on any other recording medium, such as CD-ROM, hard disk storage, or other volatile or non-volatile memory. It is also possible to transmit this information to a remote location for recording, or for immediate use.

In accordance with the invention, even the original recording of video data of a speaker's face and audio data corresponding to the video data includes obscured video data and manipulated audio data that protects the identity of subject 110 on the recording medium. Thus, no recording exists with the identity of subject 110 revealed.

Referring finally to FIG. 3, a particular embodiment of the invention is depicted in which the skin tone detail portion of video data 120 has been replaced by a graphic mosaic so as to obscure the identity of the subject. The substitution of the graphic mosaic for the skin tone detail portion of video data 120 is performed in a manner as noted above. Thus, the original recording provided on video tape 170 is recorded as shown at image 310, rather than image 300, which is the image received by video recorder 100. As noted above, no recording exists with the identity of subject 110 visible, and greater security thus is provided.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention hereindescribed and all statements of the scope of the invention which, as a matter of language, might be said to fall therebetween.

What is claimed:

1. A method for recording video data, comprising the steps of:
   receiving unrecorded video data representative of a subject;
   detecting skin tone detail of said subject;
   manipulating said video data corresponding substantially only to said detected skin tone detail to obscure said video data corresponding to said detected skin tone detail; and
   recording said video data including said manipulated video data.

2. The method of claim 1, wherein said subject includes at least a face of a speaker.

3. The method of claim 1, wherein the skin tone of said subject is automatically detected.

4. A method for recording video data, comprising the steps of:
   receiving unrecorded video data representative of a subject;
   detecting skin tone detail of said subject;
   manipulating said video data corresponding substantially only to said detected skin tone detail; and
   recording said video data including said manipulated video data, wherein an operator indicates which portion of said video data corresponds to said skin tone detail of said subject.

5. The method of claim 1, further comprising the step of detecting at least a second skin tone detail of said subject.

6. The method of claim 5, wherein said video data to be manipulated corresponds substantially only to said detected skin tone detail and said detected at least second skin tone detail.

7. A method for recording video data, comprising the steps of:
   receiving unrecorded video data representative of a subject;
   detecting skin tone detail of said subject;
   manipulating said video data corresponding substantially only to said detected skin tone detail;
   recording said video data including said manipulated video data; and
   determining the portion of the detected skin tone detail to be overlayed by a graphic.

8. The method of claim 7, wherein said graphic overlay comprises a mosaic.

9. The method of claim 7, wherein said graphic comprises an out-of-focus image.

10. The method of claim 7, wherein said graphic includes a dark portion.

11. The method of claim 1, further comprising the steps of receiving audio data from said subject and manipulating said audio data.

12. The method of claim 1, further comprising the step of transmitting said manipulated video data to a remote location prior to recording.

13. An apparatus for recording video data, comprising:
    means for receiving unrecorded video data representative of a subject;
    a skin tone detail detector for detecting skin tone detail of said subject;
    means for manipulating the video data corresponding substantially only to said detected skin tone detail to obscure said video data corresponding to said detected skin tone detail; and
    means for recording said video data including said manipulated video data.

14. The apparatus of claim 13, wherein said subject includes at least a face of a speaker.

15. The apparatus of claim 13, wherein said skin tone detail detector automatically detects the skin tone of said subject.

16. An apparatus for recording video data, comprising:
    means for receiving unrecorded video data representative of a subject;
    a skin tone detail detector for detecting skin tone detail of said subject;
    means for manipulating the video data corresponding substantially only to said detected skin tone detail; and
    means for recording said video data including said manipulated video data, wherein an operator indicates which portion of said video data corresponds to said skin tone detail of said subject.

17. The apparatus of claim 13, further comprising a second skin tone detail detector for detecting a second skin tone detail of said subject.

18. The apparatus of claim 17, wherein said means for manipulating the video data manipulates said video data corresponding substantially only to said detected skin tone detail and said detected at least second skin tone detail.

19. An apparatus for recording video data, comprising:
    means for receiving unrecorded video data representative of a subject;
    a skin tone detail detector for detecting skin tone detail of said subject;
    means for manipulating the video data corresponding substantially only to said detected skin tone detail;
    means for recording said video data including said manipulated video data; and
    means for determining the portion of the detected skin tone detail to be overlayed by a graphic.

20. The apparatus of claim 19, wherein said graphic overlay comprises a mosaic.

21. The apparatus of claim 19, wherein said graphic comprises an out-of-focus image.

22. The apparatus of claim 19, wherein said graphic includes a dark portion.

23. The apparatus of claim 13, further comprising means for receiving audio data from said subject and means for manipulating said audio data.

24. The apparatus of claim 13, further comprising means for transmitting said manipulated video data to a remote location prior to recording.

25. An apparatus for recording video data, comprising:
    a receiving apparatus for receiving unrecorded video data representative of a subject;
    a skin tone detail detector for detecting skin tone detail of said subject;
    a video data manipulator for manipulating the video data corresponding substantially only to said detected skin tone detail to obscure said video data corresponding to said detected skin tone detail; and
    a recorder for recording said video data including said manipulated video data.

26. The apparatus of claim 25, wherein said subject includes at least a face of a speaker.

27. The apparatus of claim 25, wherein said skin tone detail detector automatically detects the skin tone of said subject.

28. An apparatus for recording video data, comprising:
   a receiving apparatus for receiving unrecorded video data representative of a subject;
   a skin tone detail detector for detecting skin tone detail of said subject;
   a video data manipulator for manipulating the video data corresponding substantially only to said detected skin tone detail; and
   a recorder for recording said video data including said manipulated video data, wherein an operator indicates which portion of said video data corresponds to said skin tone detail of said subject.

29. The apparatus of claim 25, further comprising a second skin tone detail detector for detecting a second skin tone detail of said subject.

30. The apparatus of claim 29, wherein said video data manipulator manipulates said video data corresponding substantially only to said detected skin tone detail and said detected at least second skin tone detail.

31. An apparatus for recording video data, comprising:
   a receiving apparatus for receiving unrecorded video data representative of a subject;
   a skin tone detail detector for detecting skin tone detail of said subject;
   a video data manipulator for manipulating the video data corresponding substantially only to said detected skin tone detail;
   a recorder for recording said video data including said manipulated video data; and
   an indicator for indicating the portion of the detected skin tone detail to be overlayed by a graphic.

32. The apparatus of claim 31, wherein said graphic overlay comprises a mosaic.

33. The apparatus of claim 31, wherein said graphic comprises an out-of-focus image.

34. The apparatus of claim 31, wherein said graphic includes a dark portion.

35. The apparatus of claim 25, further comprising an audio data receiver for receiving audio data from said subject and an audio data manipulator for manipulating said audio data.

36. The apparatus of claim 25, further comprising a transmitter for transmitting said manipulated video data to a remote location prior to recording.

* * * * *